United States Patent [19]
Lapohn

[11] Patent Number: 5,770,797
[45] Date of Patent: Jun. 23, 1998

[54] TIRE PRESSURE MAINTENANCE SYSTEM

[76] Inventor: Gary G. Lapohn, 827 Bassett Rd., Westlake, Ohio 44145

[21] Appl. No.: 831,581

[22] Filed: Apr. 9, 1997

Related U.S. Application Data

[63] Continuation of Ser. No. 608,671, Feb. 29, 1996, abandoned.

[51] Int. Cl.$^6$ .................................................. B60C 23/04
[52] U.S. Cl. ....................................... 73/146.8; 116/34 R
[58] Field of Search ........................ 73/146.8; 301/108.4; 116/34 R

[56] References Cited

U.S. PATENT DOCUMENTS

| | | | |
|---|---|---|---|
| 3,208,425 | 9/1965 | Jousma et al. ...................... | 73/146.8 X |
| 4,953,395 | 9/1990 | Jard ......................................... | 73/146.8 |
| 4,971,396 | 11/1990 | Morris ............................... | 301/108.4 X |
| 5,100,206 | 3/1992 | Feng ..................................... | 73/146.8 X |
| 5,263,770 | 11/1993 | Goudey ............................. | 301/108.4 X |

FOREIGN PATENT DOCUMENTS

| | | | |
|---|---|---|---|
| 454919 | 3/1949 | Canada ................................ | 301/108.4 |

*Primary Examiner*—George M. Dombroske
*Assistant Examiner*—Joseph L. Felber
*Attorney, Agent, or Firm*—Vytas R. Matas

[57] ABSTRACT

A tire monitoring system is disclosed for a single or dual wheel tire assembly having a pair of analog/digital readout pressure gauges and associated valve stems for individually monitoring and pressurizing the tire or tires of the wheel assembly. The monitoring assembly may be located on a full wheel streamlined hub cap which can be mounted to the outside wheel of the dual wheel assembly by a U-shaped bracket connected to the wheel through the wheel bolts with the hub cap connected thereto by quarter turn fastener assemblies to insure a strong mounting to the wheel.

20 Claims, 4 Drawing Sheets

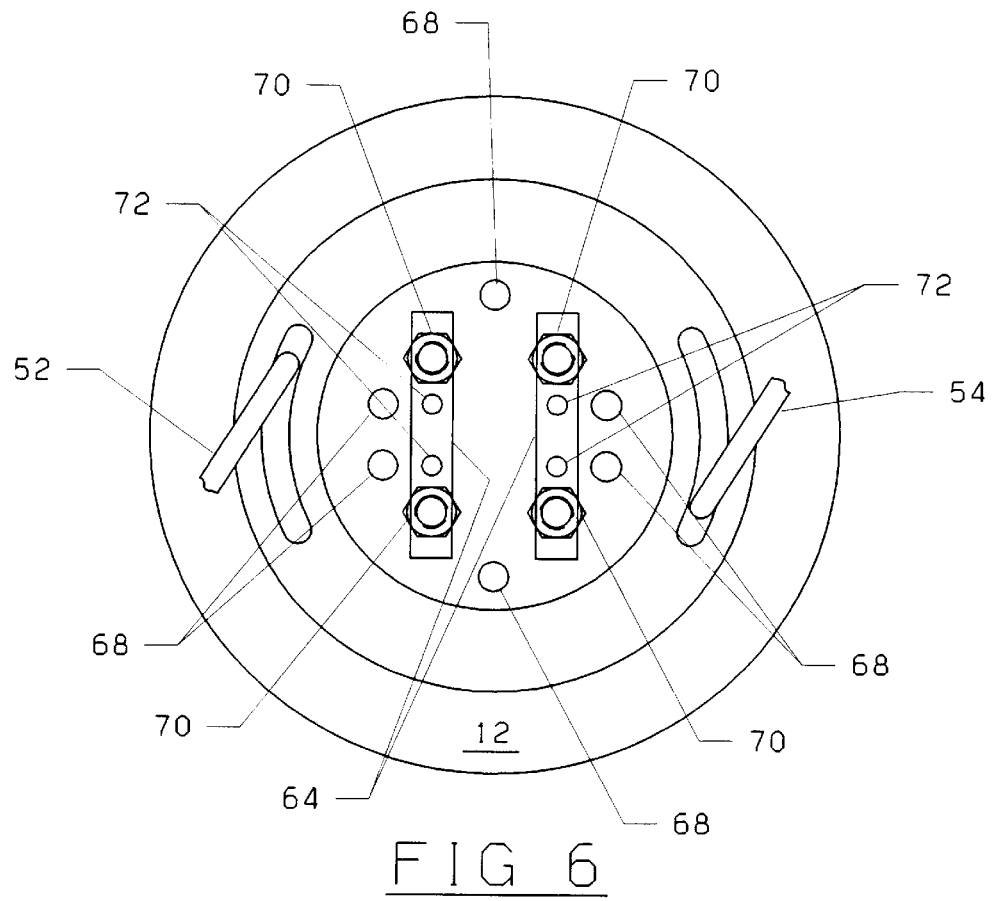
FIG 6
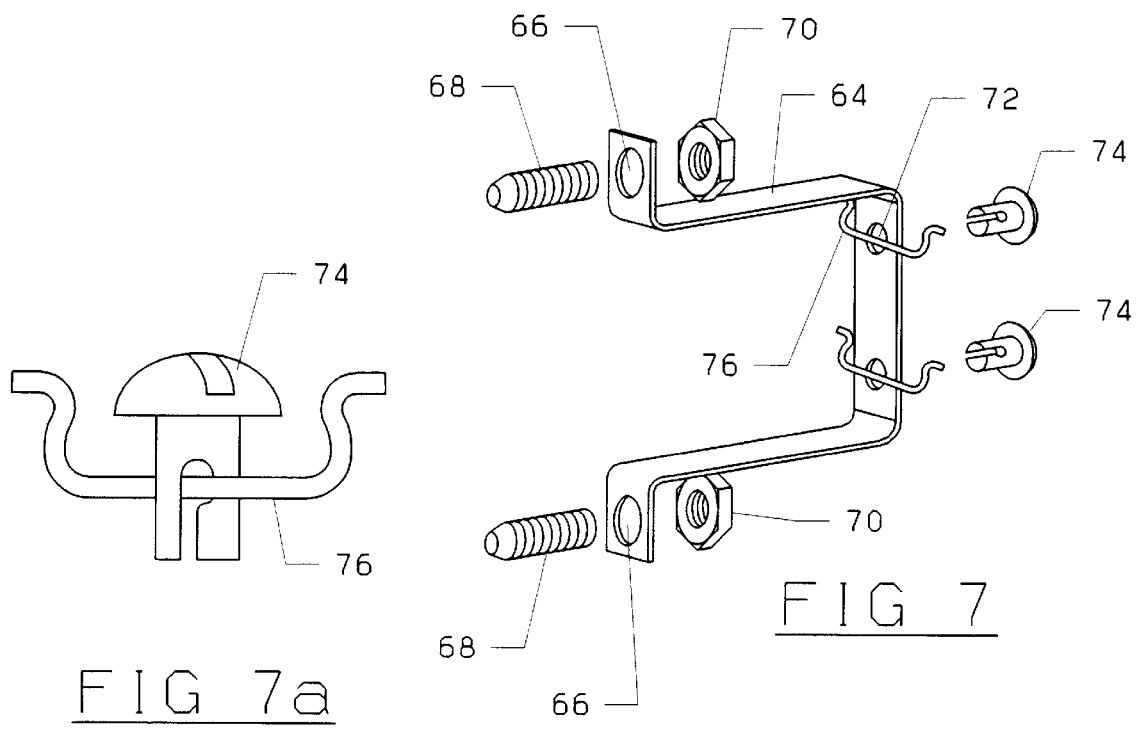
FIG 7a
FIG 7

TIRE PRESSURE MAINTENANCE SYSTEM

This is a continuation of application Ser. No. 08/608,671 filed Jan. 29, 1996 now abandoned.

BACKGROUND OF THE INVENTION

1. Field of the Invention

The present invention relates to tire pressure indicating and maintenance systems in general and more particularly to such systems offering digital and analog tire pressure indicators and easy access tire fill valves for single and dual wheel tire assemblies.

2. Description of the Prior Art

Fuel and tires represent the greatest operating cost for a single tractor/trailer or an entire fleet. If a truck tire that normally operates at 100 psi is 25–30% under inflated, this causes excessive thread wear due to heat and friction and reduces fuel efficiency due to resistance and drag. At today's average cost of $200–$300 per tire, under inflation could account for as much as $75 per tire in tire costs alone. Under inflation also negatively impacts the longevity of tire casings. Proper air maintenance assures that tires can be recapped up to 5 time.

Prior art methods and devices for maintaining proper tire pressure include pressure gauges that are carried by the driver and which are used to periodically check the tire pressure and to fill same to proper levels. It is also known to use tire gauges or indicators which are permanently mounted to the tire valve stem to provide a readout of the tire pressure when viewed by the truck operator.

Truck drivers most commonly use the manual pressure gauges to check tire inflation pressure usually after first tapping the tire with their foot or tool and finding that it was low. Such a check detects a low tire only after a significant loss of tire pressure. On a slow leak, the tire has been operating at low pressure for some time and some tire degradation has already occurred. Also, over pressure is not detectable by such tapping of the tire.

Permanently mounted tire gauges and indicators on the tire valve stem adjacent the rim are small in size and require the operator to bend down to the tire level before he can see the gauge pressure reading. Some gauges mounted away from the rim tire valve are actually covered with a cover and required an effort on the part of the operator to remove the cover before checking the gauges. No known permanently mounted tire pressure maintenance systems offer an easily seen gauge which can be easily viewed by the truck operator as he walks by the wheels of a stationary vehicle to see if the inflation pressure is in the proper range (neither under inflated nor over inflated).

One known specific example is the permanently mounted tire inflation indicator is found in U.S. Pat. No. 3,958,526. An under inflation type warning system is disclosed where a collapsible bladder mounted axially on the wheel is connected to a tire and is inflated whenever the tire pressure falls below a predetermined level. However, there is no warning provided by this system for a slowly leaking tire or for over inflation. There is no easily seen gauge which will show the pressure in the tire at all times and will guide the operator in inflating the tire to the proper level. The system uses the conventional tire fill valves.

Another example may be found in U.S. Pat. No. 4,387,931. Here a pressurized container regulated to the desired tire pressure is continuously connected to all of the tires to thus maintain them all at the proper pressure level. However, this system provides no actual gauge readings of tire pressure and a failure of the pressure regulator or the container could result in an undetected over pressurized or under pressurized condition in all of the tires. There are no conventional tire fill valves used.

A dual-tire, wheel assembly tire pressure indicating system is disclosed in U.S. Pat. No. 4,953,395. The gauge or gauges are located in the center hub of the wheel and hence are covered with a removable cover requiring the operator to bend down to wheel level to uncover and view the gauges. Further, there is no indication that the gauges offer any area markings thereon to indicate proper or improper inflation along with an analog pressure readout thereon to aid tire inflation to the optimal tire pressure of 100 psi. nor is there any logo identifying which gauge is for the front and which for the back tire of the dual wheel assembly.

SUMMARY OF THE INVENTION

The present invention solves problems associated with prior art devices as well as other problems by providing a hub cap mountable tire pressure maintenance system comprising a pair of digital/analog indicating tire pressure gauges, offset from the center of the hub cap and mounted to provide an aperture space thereon for a relatively large pressure gauge face whose digital area indicator of proper or improper tire inflation is easily visible to the operator passing the dual-wheel assembly. Each gauge has marking logo means proximate thereto indicting the wheel it is associated with.

A valve stem is also extendable through an aperture on the hub cap proximate to each gauge and is connected to the appropriate tire indicated by its proximate gauge. This allow a quick inflation/deflation of a tire to the optimal pressure using the analog readout also located on the gauge. Each gauge is located proximate to the appropriate valve stem for proper tire filling convenience.

The hub cap assembly is mountable to the front wheel of a deep dish dual wheel assembly through a bracket assembly connected by wheel bolts or nuts to oppositely located studs of the outside wheel of the dual wheel assembly. The hub cap is a full wheel hub cap and has a series of openings or apertures for mounting reflectors therein to increase the side visibility of the dual-wheel assembly to night traffic.

In view of the foregoing it will be seen that one aspect of the present invention is to provide a hub cap for a tire wheel having an easily visible tire pressure gauge and a tire inflation valve stem mounted proximately thereto.

Another aspect of the present invention is to provide a tire pressure indicating system for a dual-wheel tire assembly having a pair of large off-center spaced digital tire pressure gauges whose proper pressure range is easily seen by a truck operator walking by the wheel assembly.

Yet another aspect of the present invention is to provide a tire pressure maintenance system for a dual-wheel tire assembly having a pair of off-center spaced tire pressure gauges with associated tire fill valve stems located proximate to each gauge to allow the monitored inflation of the tire monitored by the associated gauge.

Still yet another aspect of the present invention is to provide a streamlined full wheel hub cap for a deep dish wheel assembly securely mounted to the hub of the wheel assembly.

Still yet another aspect of the present invention is to provide a streamlined hub cap having a tire pressure display thereon.

Still yet another aspect of the present invention is to provide a highly reflective hub cap for a tire assembly having a tire pressure display thereon.

These and other aspects of the present invention will be more fully understood after a review of the following description of the preferred embodiment when considered along with the associated drawings.

BRIEF DESCRIPTION OF THE DRAWINGS

In the drawings:

FIG. 6 is a front view of the dual wheel tire assembly showing mounting brackets for mounting the hub cap of FIG. 1 thereto.

FIG. 7 is a perspective view of one of the mounting brackets shown in FIG. 6 showing the quarter turn fasteners used to mount he hub cap to the brackets.

FIG. 7a. is a perspective view of the quarter turn fastener mounted to the spring of the FIG. 7 assembly.

DESCRIPTION OF THE PREFERRED EMBODIMENT

Figure 1:
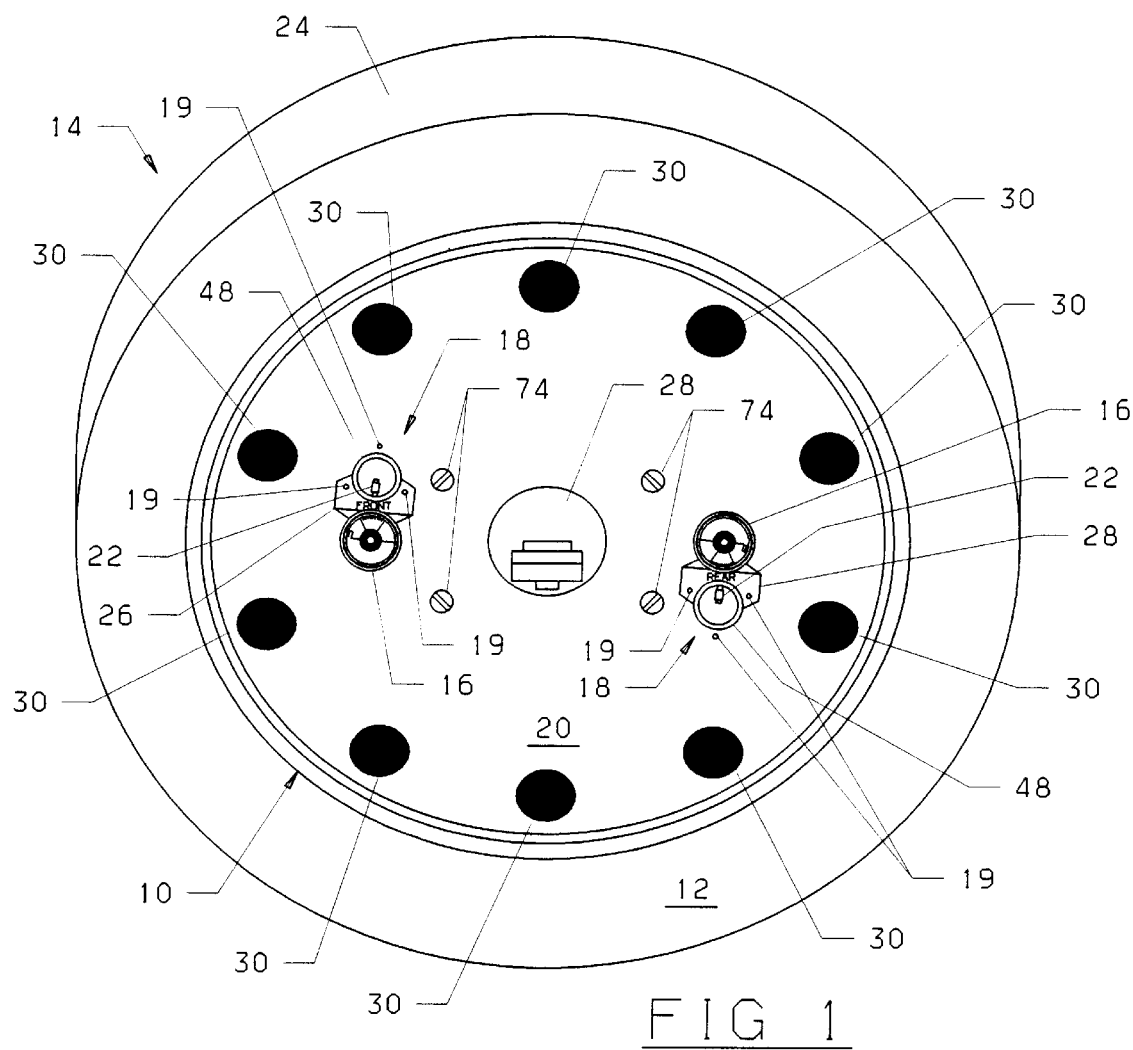
FIG. 1 is a perspective view of the tire pressure maintenance system of the present invention mounted on a hub cap covering the front wheel of a dual-wheel tire assembly.

Referring now to the drawings generally and particularly to FIG. 1, a hub cap mounted tire maintenance assembly (10) is shown therein mounted to an outside wheel (12) of a dual tire wheel assembly (14).

Figure 1A:
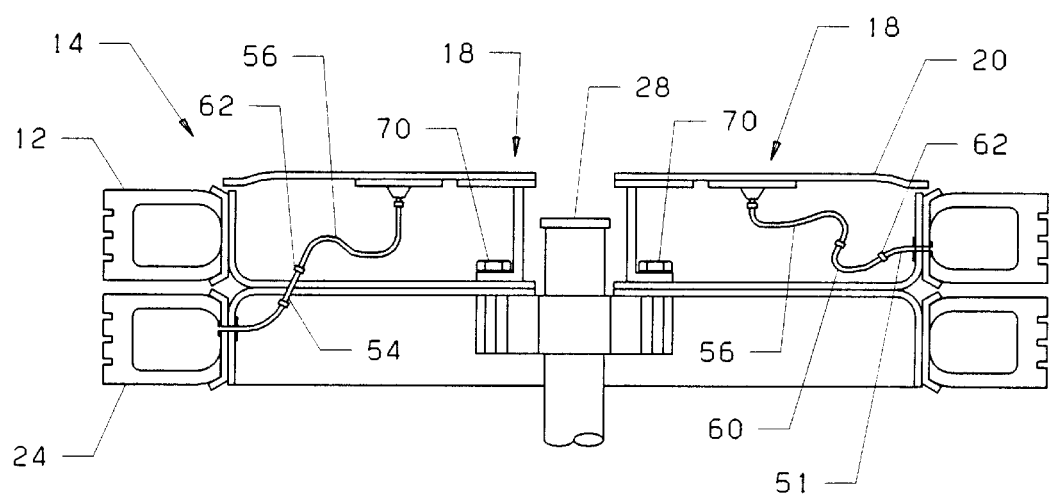
FIG. 1a. is a side view of the FIG. 1 assembly.
Figure 5:
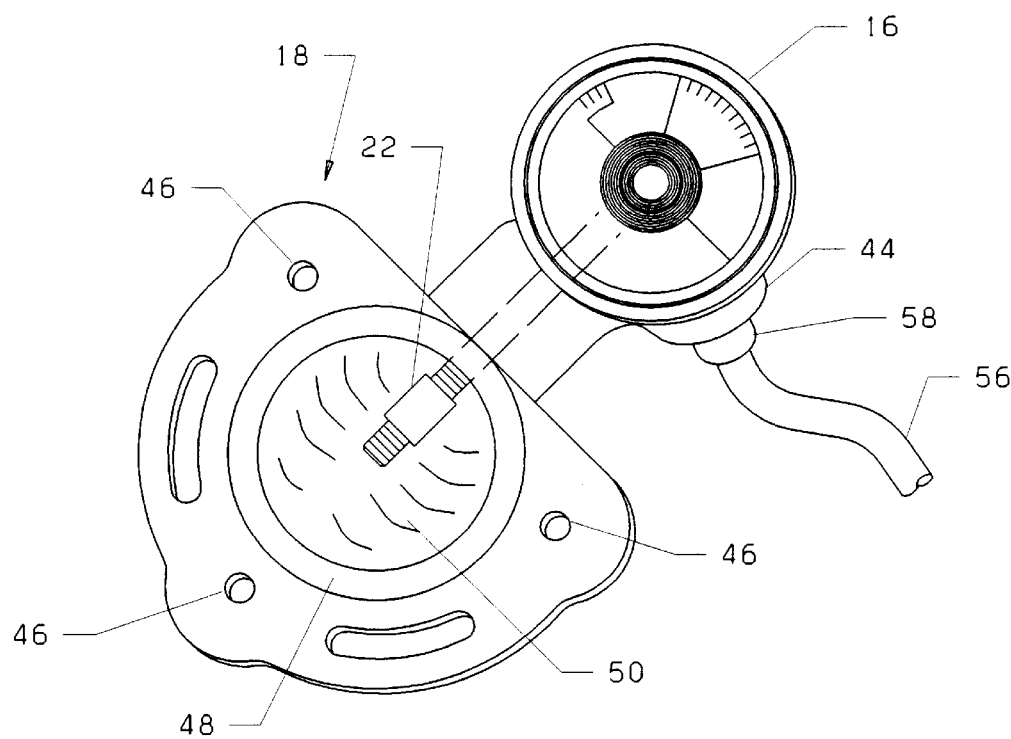
FIG. 5 is a perspective view of the fill valve assembly of FIG. 3 with the tire gauge of FIG. 2 mounted thereto for assembly to the hub cap of the FIG. 1 assembly.

The tire maintenance assembly essentially comprises a pair of Bourdon type tire pressure gauges (16) each mounted to a tire fill valve assembly (18) in a manner which will be described later with reference to FIG. 5. The valve assemblies (18) are fastened by rivets or other known means to the rear side of a hub cap (20) so that valve stems (22) and gauges (16) project into appropriately formed holes or apertures in the hub cap (20) to be essentially flush with the front of the hub cap (20). The assemblies(18) are separately connected to the conventional tire valves stems extending from the rims of the front tire (12) and a rear tire (24) of the dual wheel assembly as best seen in FIG. 1a as will be described later. The dual wheel assembly comprises two tire wheels assembled back to back. An identifying FRONT and REAR tire logo (26, 28) is located on the hub cap (20) proximate the appropriate assembly (18) to easily identify to the truck operator which tire is possibly under or over inflated as shown by the gauge (16) and which associated valve stem (22) should be used to bring the tire inflation to normal. It is very advantageous to the operator to have the gauge (16) monitor the tire pressure change at his eye level as he bends down to either fill or relieve the appropriate tire pressure through the associated valve stem. The gauge (16) has an analog display to aid the operator in filling the tire to the optimal pressure of 100 psi. The logos (26, 28) could be formed as a plate that is riveted to the hub cap (20) by the same rivets (19) holding the tire stem assembly (18) thereto. Alternatively it could be formed as an adhesive decal or emblem, a logo stamped into the hub cap (20) or it could be formed integrally in the valve stem assembly if it is plastic molded.

It will be noted that should the dual wheel assembly (14) has an associated odometer (28) available commercially as the HUBODOMETER odometer. It is mounted on the axle of the wheel assembly (14) and will project to a central aperture of the hub cap (20). The tire monitoring assemblies (18) being offset from this central area do not interfere with this central odometer (28) mounting as is the case with certain prior art tire gauge systems. Furthermore, since the mounting assemblies (18) are preferably located on opposite sides of the hub cap the dynamic balance of the wheel assembly (14) is not upset. More importantly, this opposite side area of the hub cap (20) allows a relatively large pressure gauge (16) face to be mounted therein whose digital like display of proper or improper tire inflation is easily seen by the truck operator as he walks past the rig to thus view if his tires are properly inflated without having to bend down by each gauge and open doors to view the gauges as in certain described prior art systems.

The hub cap (20) is manufactured from 18–22 gauge stainless steel and has the tire fill valve stem (22) for each tire of the wheel assembly (14) mounted on the hub cap (20). The hub cap (20) is made to cover the entire exposed wheel area inside the tire rim on the front side of the wheel by slightly overlapping some. The gauges (16) and the air fill valves (22) are preferably mounted on the back of the hub cap (20) of the wheel and they are viewably accessible through individual openings in the hub cap (20). The openings are preferably such that the face of the gauges (16) is essentially flush with the front side of the hub cap (20) to provide easy reading without affecting the aerodynamic characteristics of the hub cap. The hub cap (20) is made to have an aerodynamic construction to improve or maintain the aerodynamics of the wheel, particularly to improve the aerodynamics of deep dish wheels shown in FIG. 1a . . . In such wheels the deep dish formed by the tire rim and the radial wheel portion which is offset to the back side of the rim to from the bottom of the dish with the rim being the side of the dish, creates air flow disturbances at high speeds and puts a drag on the wheel as well as tending to lift it off the ground. While any cover will improve the aerodynamics of the deep dish wheel, the better the aerodynamics of the hub cap (20) the more the overall improvement. For maximum aerodynamics the outside of the hub cap (20) is made smooth and is made to curve toward or overlap the lower or inside part of the front wall of the tire rim which normally is displaced inwardly from the front outside surface of the rim adjacent the tire.

The hub cap (20) also has a series of decorative reflectors (30) located in circular alignment around the outer edge of the hub cap as seen in FIG. 1 . . . These reflectors (30) are snapped into circular apertures in the hub cap (20) in a known manner. These reflectors (30) could also be removed to provide air movement through the wheel assembly (14). It should be noted that in situations where the odometer (28) is not used, a central reflector (not shown) could be snapped into this aperture to further increase the side visibility of the vehicle in night traffic. The hub cap (20) could be made from various other materials such as plastic providing the material is formed smooth, is resistant to corrosion and deterioration from gasoline, diesel fuel, oil and withstands the wide temperature ranges in which trucks and trailers operate.

Figure 2:
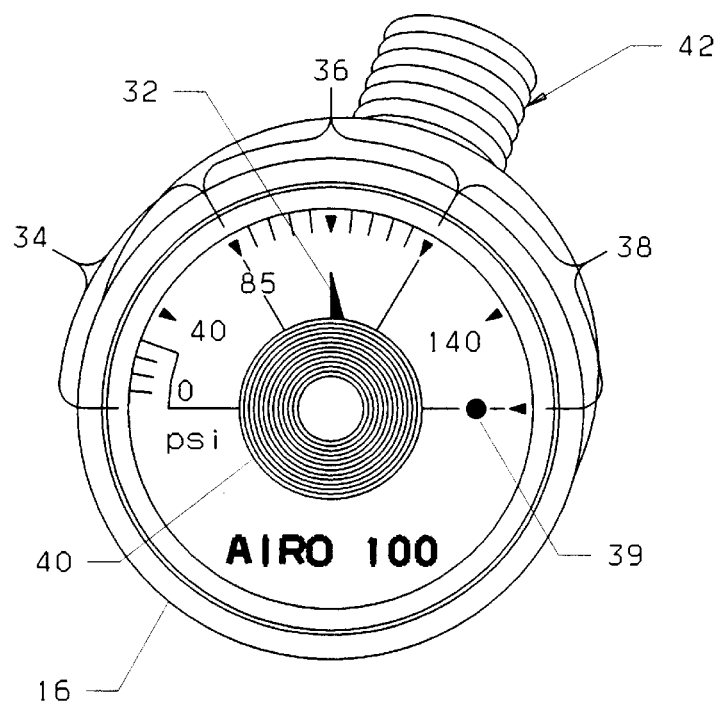
FIG. 2 is a perspective view of the Bourdon tube type tire gauge used in the tire maintenance system shown in FIG. 1.
Figure 3:
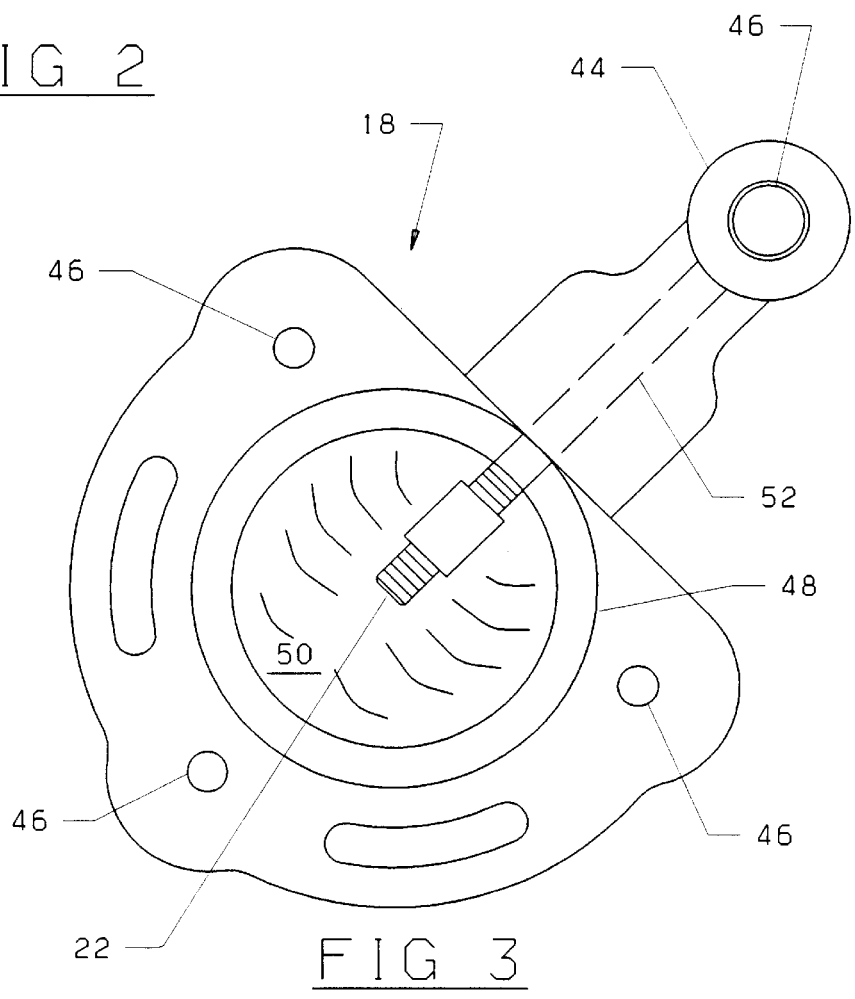
FIG. 3 is a perspective view of the tire fill valve assembly used in the tire maintenance system shown in FIG. 1.
Figure 4:
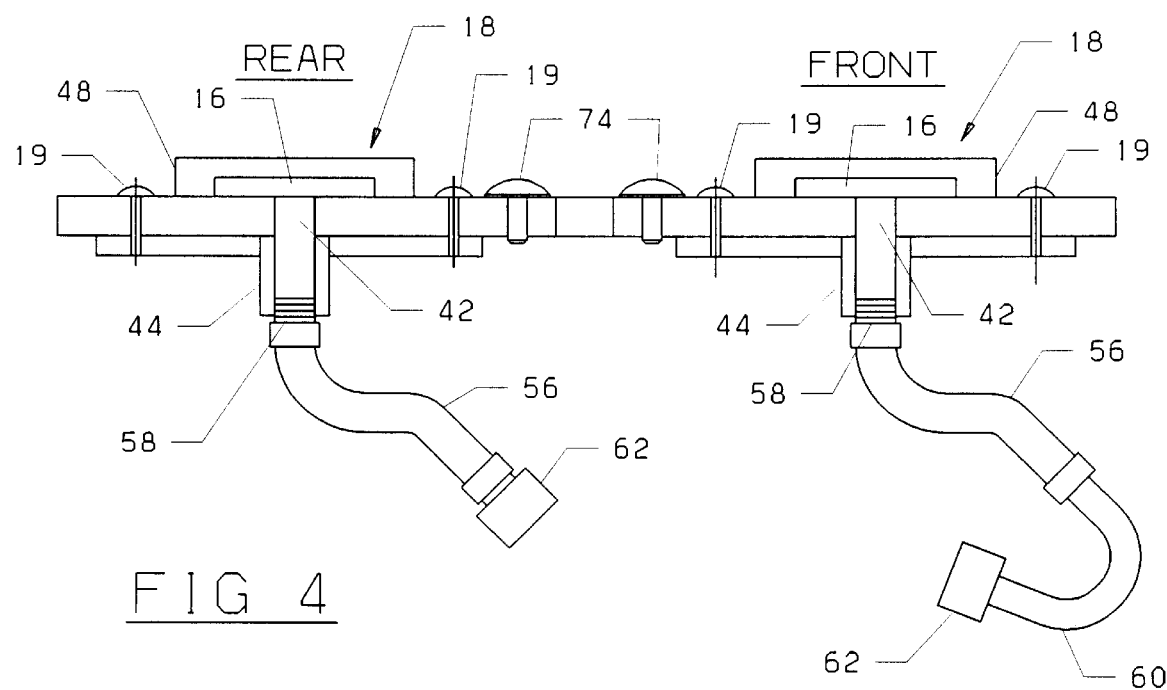
FIG. 4 is a side view of the hub cap mounted tire maintenance system shown in FIG. 1.

Turning next to FIG. 2, the gauge (16) is a Bourdon tube type pressure gauge having an indicator (32) extending from a spiral spring of the gauge (16). The gauge (16) is calibrated to an analog scale of marked tire pressure from 0–180 psi. Also, the scale is divided into three areas (34, 36, 38) of two different colors to provide a digital indication of safe or unsafe tire pressure inflation thereby. The central area (36) is colored green to indicate an area of proper tire inflation. When the white indicator (32) is in this area a truck operator walking by the tire assembly(14) can easily see this display and determine that his tires are properly inflated. The outer areas (34) and (38) are colored red and the white indicator (32) is easily seen on this background to indicate a tire problem condition of over or underinflation since red is associated with warnings. Thus these red and green areas provide a two level or digital display of proper or improper tire inflation to the operator without requiring a readout of the actual gauge pressure. If an improper inflation level is indicated by the digital display, the operator then uses an air hose to fill or relieve the tire through the valve stem (22) associated with the viewed gauge (16) to bring the tire to the proper inflation level. Under these conditions the analog scale of the gauge (16) is used to easily bring the tire not only back to the safe inflation green zone but inflates the tire to the optimal inflation point of 100 psi which is indicated thereon by a white hash mark (40) in the green area (36) having an associated logo of 100 psi next to it. A stop post (39) is located on the gauge (16) near the end of the analog scale to prevent the indicator (32) from over extending during high speed wheel rotation.

The gauge (16) has a threaded pressure inlet port (42) which screws into a T-section (44) of the fill valve assembly (18) along the top thereof into an internally threaded section (46) having threads complimentary to the threads of the pressure inlet port (42). Once this is accomplished, the assembly (18) with the gauge (16) mounted therein is aligned with formed apertures in the hub cap and riveted to the hub cap (20) by rivets (19) extending through holes (46) in the assembly (18) and the formed apertures in the hub cap (20).

The assembly (18) has a rim (48) extending up from the hub cap (20) surrounding a concave section (50) into which the valve stem (22) is threadably inserted to communicate with the T-section (44) by passageway (52). The concave location of the valve stem (22) protects the valve stem (22) and assures that the hub cap (20) will maintain a smooth streamlined flow of air past the hub cap (20) during high speed vehicle operation.

With particular reference to FIGS. 4–6 and 1a, it will be seen that once the valve assembly (18) and gauges (16) are fastened to the hub cap (20), pressure communication with the proper front (12) or rear (24) tire must be established. It is known that outside tire (12) of a dual wheel assembly (14) has a rim valve stem (52) that extends from the rim of the wheel toward the inside wheel of the assembly (14) while the inside wheel (24) has a rim valve stem (54) that extends toward the outside wheel. Utilizing these conventional rim valve stems, flexible hoses (56) are used to connect the appropriate outside and inside air tire valve stems (22) and associated gauges (16) to the proper tire valve stems (52, 54). The hoses (56) have threaded stem centered connectors (58) which sealably screw into the bottom of T-section (44) and are long enough to allow the hub cap (20) to be removed from the dual wheel assembly (14) a sufficient distance to enable the hoses (56) to be disconnected when necessary. The assembly (18) connected to the FRONT indicating face has a 180° coupling (60) connected to the other end of the flexible hose (56) terminating in a coupling (62) for sealably screwing on to a tire valve stem (51). The assembly (18) connected to the REAR indicating face has an in line straight coupling (62) which connects to the valve stem (54). The connection of the hub cap (20) mounted assembly (18) now becomes simple. As best seen with reference to FIG. 1a the outside or front tire stem (51) which extends into the back tire is easily coupled through the 180° section (60) which can be made to face the stem (51) and thus easily threaded thereon while rear tire stem (54) is most easily coupled through the in line coupling (62). Thus communication of tire pressure is properly routed to the FRONT and REAR indicating gauge (16) and associated valve stems (22). The gauges (16) and air fill assembly means (18) on the hub cap (20) are connected to the rim valved stems (51,54) or extenders thereof by hoses (56) which have a length such that the hub cap (20) may be moved outwardly from the wheel to allow it to be laid aside to gain access to the full wheel or to be disconnected from the cover for purposes of removing the wheel or for removing the hub cap (20) for whatever purpose.

For a secure mounting at high seeds or for bumps or potholed roadways, the hub cap (20) is preferably not snapped onto the wheel rim, as is the conventional practice for full wheel hub caps, but is mounted to a bracket structure clamped to the axle hub along with the wheel by the lug nuts mounting the wheel on the axle hub. The fastening means for connecting the hub cap to the bracket may be fasteners which have shallow heads that are spherically curved outwardly from the perimeter of the bottom of the head. The head may be that of a security fastener requiring special tools or implements for removing the fastener to allow the hub cap to be taken off the bracket. Thus the hub cap (20) mounted assembly (18) is mounted to the front wheel (12) by a pair of ⅛ inch stainless steel brackets(64). The brackets have spaced openings (66) for fitting the bracket (64) over oppositely located studs (68) and fastened to the wheel by bolts (70) associated with the studs (68). On a 10 stud wheel, the bracket openings (66) are mounted on the number 1 and 8 stud and the other on the 3 and 6 stud when counting clockwise from the first mounting bracket hole (66). The U-shaped bracket (64) has top apertures (72) aligned with four quarter turn fasteners (74) extending from the hub cap (20). The fasteners (74) are inserted into the apertures (72) and turned one quarter turn to lock the fastener to a spring (76) located on the inside of the bracket (64). As best seen in FIGS. 7 and 7a, springs (76) are located proximate the apertures (72). The quarter turn fasteners (74) are locked therein by turning them one quarter turn. The structure and operation of such fasteners are well known and they are available from Milspec Products Inc. for various heavy duty Aerospace and racing applications.

Thus, as can be seen from the foregoing, the present invention provides a new system for gauging and filling the tires on vehicles or trailers and while adaptable for most all tire wheels, single or dual, it is particularly useful with dual deep dish wheels as commonly used on trucks and tractor-trailer rigs. Dual wheel assemblies are basically two single such wheels bolted together back to back as shown in FIG. 1a. The described air-fill, gauging system of the present invention provides readily accessible tire fill valve stems for filling or lowering the air pressure in respective tires and preferably a tire pressure gauge for each tire; although, on a dual wheel, a single gauge means could be connected so that it could be used to indicate the air pressure of either tire selectively. However, this would not enable a trucker to view the air pressure of both tires by merely walking by the wheels.

It will be understood by those skilled in this art area that certain modifications and improvements have not been included herein for the sake of conciseness and readability but are properly intended to fall within the scope of the following claims. As an example, the heads of the quarter turn fasteners could be made with a uniquely formed head which would turn to release the hub cap (20) from the wheel (12) only with the use of a complimentary tool made for this uniquely formed head. This would deter theft of the hub cap (20) and the assembly mounted thereto.

I claim:

1. A hub cap mounted tire monitoring system comprising;
    a hub cap having a series of apertures therein;
    a tire pressure gauge mountably extending through one of said series of apertures;
    a valve stem assembly extending through one of said series of apertures;
    manifold means for communicating tire pressure to said tire pressure gauge and said valve stem assembly whenever said manifold means is connected to monitor tire pressure, and
    wherein said valve stem assembly is formed as a single unit to have said tire pressure gauge rigidly connected thereto to thereby mount both said tire pressure gauge and said valve stem assembly on said hub cap proximate to each other through said one of said series of apertures with said valve stem assembly having a concave formed section along an outside surface of said hub cap for mounting said valve stem therein below said outside surface of said hub cap to protect said valve stem and maintain a smooth streamlined flow of air past the hub cap during high speed wheel rotation.

2. A hub cap system as set forth in claim 1 including a reflector mounted in an aperture of said series of apertures other than said one aperture.

3. A hub cap system as set forth in claim 1 wherein said tire pressure gauge and said valve stem assembly are located proximately to each other and have a logo identifying the tire being connected thereto.

4. A hub cap system as set forth in claim 1 wherein the hub cap is a full wheel hub cap and including a second tire pressure gauge and valve steam assembly mounted in another of said series of apertures other than said one aperture and a second manifold means for communicating tire pressure to said second tire pressure gauge and valve stem assembly whenever said second manifold means is connected to a second tire.

5. A hub cap system as set forth in claim 4 including a first logo proximate to said tire pressure gauge and valve stem and a second logo proximate to said second tire pressure gauge and valve stem, said first and second logo identifying the tires connectable thereto.

6. A hub cap system as set forth in claim 5 including a central opening in said hub cap for extending a hub mounted odometer therethrough so as to have said first and second tire pressure gauges located on opposite sides thereof.

7. A hub cap system as set forth in claim 1 wherein said tire pressure gauge has a digital readout of proper or improper tire inflation visible to a vehicle operator walking by the hub cap when mounted to a wheel of the vehicle.

8. A hub cap system as set forth in claim 7 wherein said tire pressure gauge has an analog pressure readout indicator for monitoring the tire pressure as the tire is inflated through said valve stem assembly.

9. A hub cap system as set forth in claim 7 wherein said digital readout comprises a central area of said gauge readout face being colored green to indicate a proper range of tire inflation and red areas on opposite sides of the said green area indicating under and over inflated tire conditions, viewing the area location of said analog indicator gives a digital safe or unsafe tire condition indication to a vehicle operator passing the hub cap when mounted on a vehicle tire.

10. A hub cap system as set forth in claim 1 including a mounting bracket attachable to the vehicle wheel through lug bolts holding the wheel to the vehicle and having means located thereon to mate with a quarter turn bolt extending through the hub cap to mount the hub cap to the wheel of the vehicle thereby.

11. A tire monitoring system for a dual wheel tire assembly comprising;
    a first gauge and valve stem assembly pneumatically connected to a first wheel of the dual wheel assembly to monitor the tire pressure thereof;
    a second gauge and valve stem assembly pneumatically connected to a second wheel of the dual wheel assembly to monitor the tire pressure of the second wheel;
    a combination analog and digital readout located on said first and second gauge to digitally indicate proper or improper tire inflation to a vehicle operator passing by the dual wheel assembly and to allow the operator to fill the tire to the optimal tire pressure through the associated valve stem while viewing the analog readout;
    wherein said first and second gauge and valve stem assemblies are mounted on a hub cap so as to be located on opposite sides thereof; and
    mounting means for mounting said first and second assemblies to said hub cap to have a gauge of each such assembly flush with said hub cap and a valve stem of each assembly recessed into a concave portion of said hub cap with said concave portion formed below the outside surface of said hub cap to recess said valve stems therein.

12. A tire monitoring system as set forth in claim 11 including a first logo associated with said first gauge and valve stem assembly identifying the tire monitored thereby.

13. A hub cap system as set forth in claim 12 including a second logo associated with said second gauge and valve stem assembly identifying the tire monitored thereby.

14. A hub cap system as set forth in claim 11 wherein the dual wheel tire assembly has a centrally located odometer and said first and second gauge and valve stem assemblies are located on opposite sides thereof to maintain the dynamic balance of the wheel assembly.

15. A hub cap system as set forth in claim 14 wherein said hub cap has a series of apertures having reflectors mounted therein.

16. A hub cap system as set forth in claim 15 including a U-shaped bracket mounted to the front wheel and having locking means thereon to hold the hub cap thereto through quarter turn fasteners located on the hub cap.

17. A full wheel aerodynamic hub cap mounting assembly system for a deep dish wheel assembly comprising;
    a full wheel hub cap extending over a rim of the deep dish wheel assembly and having a series of apertures therein;
    a bracket assembly having a first mounting section connectable to the nuts extending from the wheel assembly;
    a second mounting section of said bracket assembly having apertures alignable with at least some of the apertures of said hub cap;
    locking means for connecting the full wheel hub cap to the bracket assembly through the aligned apertures of said hub cap and said bracket assembly comprising quarter turn fasteners located on said full wheel hub cap for engaging locking fasteners located on said bracket assembly; and a tire pressure gauge and valve fill assembly located on the hub cap to have a gauge of said assembly flush with the outside surface of the hub cap and a fill valve of said assembly recessed into a concave portion formed along the smooth outside surface of the hub cap to mount the fill valve therein to the maintain the aerodynamics thereof.

18. A full wheel assembly as set forth in claim 17 including a series of reflectors located on said hub cap to be visible on the outside surface thereof but flush therewith to maintain the aerodynamics of said hub cap.

19. A full wheel assembly as set forth in claim 17 wherein said hub cap is made from stainless steel and is formed smooth with a curved portion extending toward a rim of the wheel assembly.

20. A full wheel assembly as set forth in claim 17 wherin said quarter turn fasteners have specially formed heads which are turned only with the use of a security tool adapted to conform to the specially formed head.

\* \* \* \* \*